United States Patent
Hosoe

(10) Patent No.: US 8,279,332 B1
(45) Date of Patent: Oct. 2, 2012

(54) ELECTRONIC APPARATUS AND FUEL CELL CONTROL METHOD FOR ELECTRONIC APPARATUS

(75) Inventor: Hiroshi Hosoe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/492,534

(22) Filed: Jun. 8, 2012

Related U.S. Application Data

(60) Continuation of application No. 12/869,507, filed on Aug. 26, 2010, which is a division of application No. 11/459,220, filed on Jul. 21, 2006, now abandoned.

(30) Foreign Application Priority Data

Jul. 29, 2005 (JP) ................... 2005-221624

(51) Int. Cl.
*H04N 5/225* (2006.01)
*H01M 8/04* (2006.01)
(52) U.S. Cl. ...................... 348/372; 429/428
(58) Field of Classification Search .................. 348/372
See application file for complete search history.

(56) References Cited

U.S. PATENT DOCUMENTS

| | | | |
|---|---|---|---|
| 2004/0023081 A1* | 2/2004 | Ushiro et al. | 429/9 |
| 2008/0008915 A1* | 1/2008 | Arikara et al. | 429/25 |

\* cited by examiner

*Primary Examiner* — Albert Cutler
(74) *Attorney, Agent, or Firm* — Canon USA, Inc., IP Division

(57) ABSTRACT

An electronic apparatus includes a fuel cell device, an image pickup device, a lens unit, a temperature sensor, and a system controller. The electronic apparatus is mobile and held in a user's hand while being operated. The fuel cell device controls electrical power generation. The image pickup device is positioned relative to the fuel cell device and converts an image into an image pickup signal. The lens unit provides the image to the image pickup device. The temperature sensor obtains a temperature from the lens unit. The system controller controls operation of the fuel cell device based on the temperature. A secondary battery stores electrical power generated by the fuel cell device. When the temperature exceeds a reference temperature and a remaining power level in the secondary battery is equal to a reference power level, the system controller halts a moving supply of fuel to the fuel cell device.

8 Claims, 7 Drawing Sheets

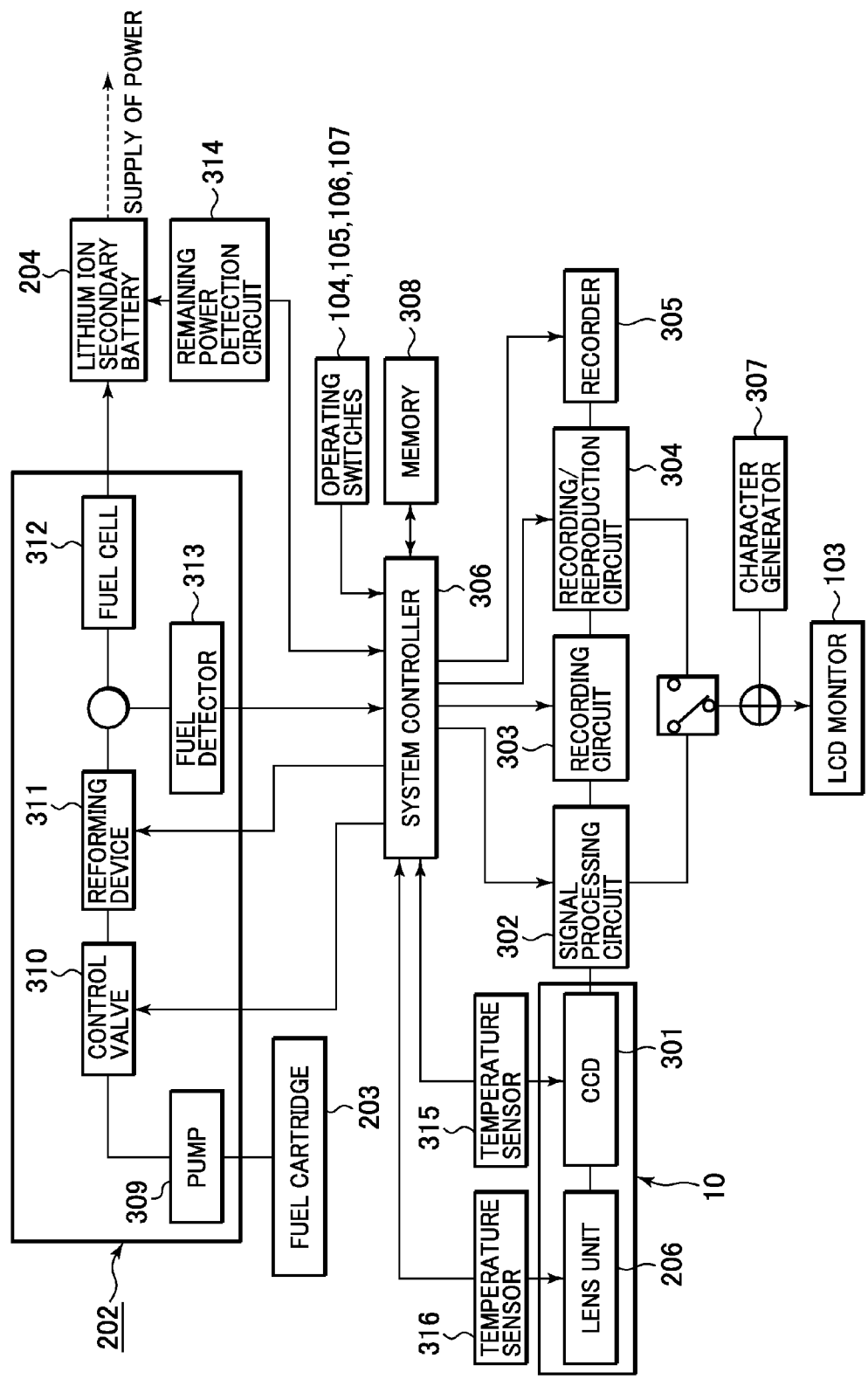

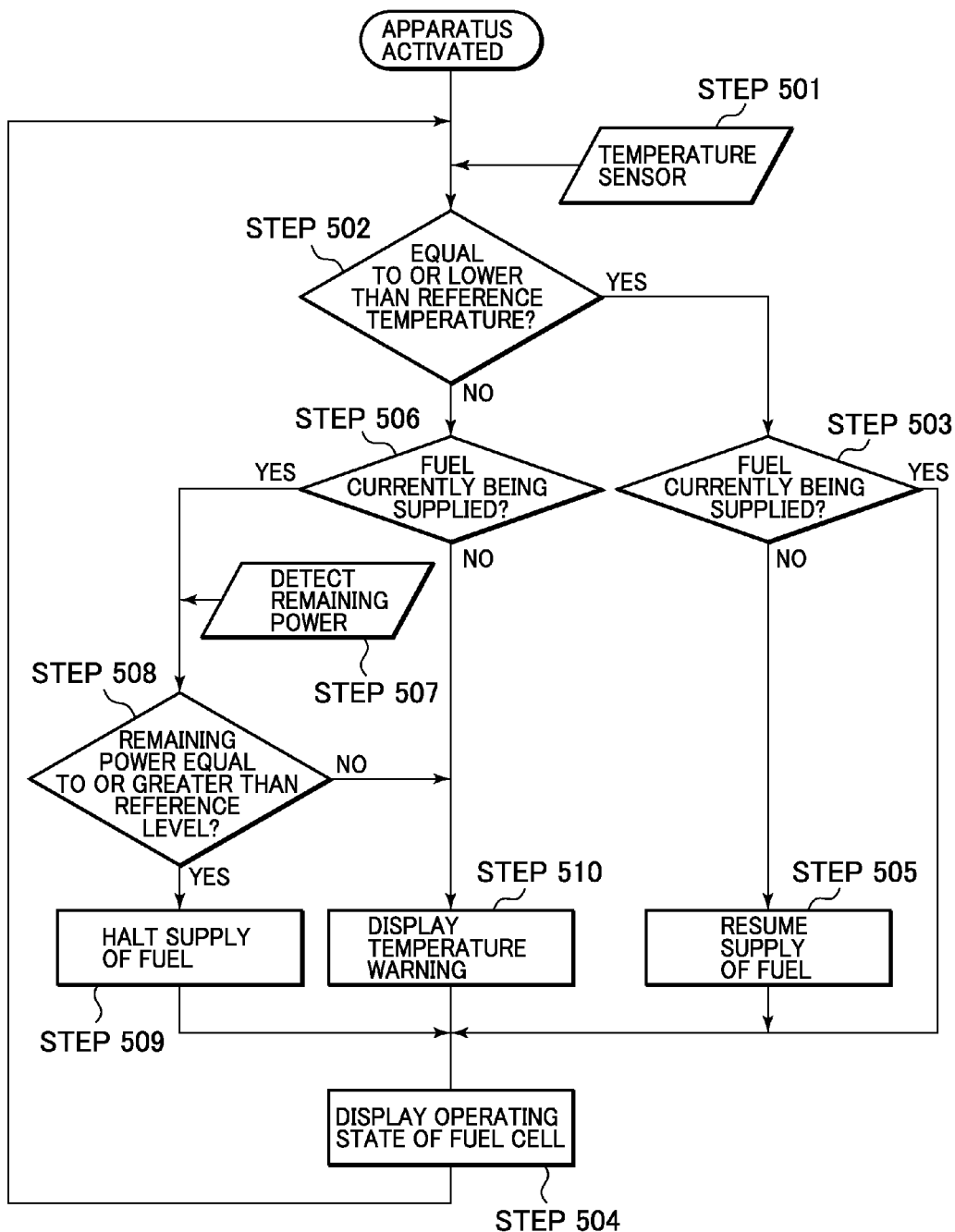

ELECTRONIC APPARATUS AND FUEL CELL CONTROL METHOD FOR ELECTRONIC APPARATUS

CROSS REFERENCE TO RELATED APPLICATIONS

This is a continuation of U.S. application Ser. No. 12/869,507, filed Aug. 26, 2010, which is a divisional of U.S. application Ser. No. 11/459,220, filed Jul. 21, 2006, which claims the benefit of Japanese Patent Application No. 2005-221624, filed Jul. 29, 2005, all of which are hereby incorporated by reference herein in their entirety.

BACKGROUND OF THE INVENTION

1. Field of the Invention

The present invention relates to an electronic apparatus, such as a video camera or a digital camera, that employs a fuel cell device as a power source, and a fuel cell control method for an electronic apparatus.

2. Description of the Related Art

For electronic apparatuses such as video cameras, rechargeable secondary batteries are generally employed as power sources. These secondary batteries are, for example, lithium ion secondary batteries, nickel-metal hydride batteries, nickel-cadmium batteries and lead-acid storage batteries. In many cases, for an electronic apparatus that includes a secondary battery, when the power provided by a battery is reduced during a battery-operated period, a low power display is provided via a display unit, and when the available battery power is equal to or lower than a specific level, the power is disconnected automatically.

On the other hand, fuel cells have been provided as power sources for electronic apparatuses, such as video cameras. A fuel cell is a power source wherein an electrochemical reaction is effected by typically using hydrogen as a fuel, and as a result of the reaction, electricity is generated to provide power to the device. There are several types of fuel cells that are consonant with different electrolytes or fuels that are employed. Also, a solid polymer fuel cell has become especially useful for electronic apparatus applications, such as video cameras.

Features of a solid polymer fuel cell are that a polymer electrolyte film is employed as an electrolyte, and that the operating temperature normally does not exceed 90 degrees C., which is lower than the other types of fuel cells. Therefore, an operation enabled apparatus temperature is quickly reached, and accordingly, the time required for activation is short, so that a solid polymer fuel cell is appropriate for an application where run and halt operations are frequently performed. Further, since the electrolyte is one formed as a thin film, the electrical resistance is low, and there is little electric loss. Therefore, the amount of power generated per unit volume can be increased, and accordingly, the entire size of an apparatus can be reduced.

For a mobile electronic apparatus for which a reduction in the size and the weight of a fuel cell is requested, the use of a large hydrogen tank or a heavy hydrogen absorbed alloy is difficult. Therefore, rather than directly using hydrogen, it is considered that the use of a methanol liquid is more proper. For the employment of methanol, two methods have been proposed: (1) a direct methanol method for supplying methanol directly to a fuel cell; and (2) a methanol reformation method for extracting hydrogen, prepared from methanol, by using a reformation device and supplying the hydrogen to the fuel cell.

In a conventional example, as previously described, a mobile electronic apparatus is disclosed that includes a controller for maintaining the temperature of a fuel cell within an operating temperature band where the fuel cell can be appropriately operated (see Japanese Patent Laid-Open Publication No. 2004-87170). Further, a technique is disclosed according to which a unit, for displaying the remaining available power of a secondary battery, is provided for an electronic apparatus that uses both a fuel cell and a secondary battery. When the fuel cell needs to be recharged, a notification is provided for a user, and the usability is improved (see Japanese Patent Laid-Open Publication No. 2003-303609).

As described above, it is anticipated that a fuel cell will be employed as the power source for an electronic apparatus; however, in this case, since heat is generated during power generation, special care must be given to ensuring the operational safety.

The amount of heat generated by a device within an electronic apparatus, especially a device such as an LSI, is increased due to the high integration that is employed, and the internal apparatus temperature tends to be elevated. Thus, when a fuel cell, which may be considered as a new heat generation source, is added, the temperature within the electronic apparatus is raised. Thus, the additional source of heat may adversely affect proper function of the apparatus.

For example, in a case where for an image pickup apparatus that includes a CCD as an image pickup device, the temperature exceeds a specific level, a pixel defect may occur because of the characteristics of the CCD. Such a defect is called a white scratch because it appears that white light is being emitted, and for a screen display, this is a quality defect.

Further, most individual operating devices include LSIs or other electronic components which have heat endurance limitations, and when the temperature in the apparatus with such components is raised excessively, function failures may occur.

In addition, when magnetic tape is employed for recording/reproduction, temperature dependant characteristics, related to the type of tape material and the method by which magnetic powder is applied to this material, contribute to such deterioration as the easy scratching of tape, which can occur at high temperatures.

Above all, since when a mobile apparatus is employed it is held in a user's hand, the excessive generation of heat during operation can discomfort a user, and can considerably degenerate the usability of the apparatus.

As described above, while a fuel cell can perhaps be inconvenient, in that the internal temperature of an apparatus is increased, at high temperatures, the reaction of the fuel cell is advanced and the functioning of the fuel cell is improved. Therefore, for the use of a fuel cell for an electronic apparatus, temperature management is very important.

SUMMARY OF THE INVENTION

An aspect of the present invention is to enable temperature management, for an electronic apparatus that employs a fuel cell device as a power source, without adversely affecting the functioning of the apparatus. In an aspect of the present invention, the electronic apparatus may include a fuel cell device, an image pickup device, a temperature sensor, and a system controller. The electronic apparatus may be mobile and may be held in a user's hand while being operated. The fuel cell device controls generation of electrical power. The image pickup device is position relative to the fuel cell device and converts an image into an image pickup signal. The temperature sensor may a temperature from the image pickup device and the system controller may control operation of the fuel cell device based on the temperature from the image pickup device. The electronic apparatus may include a lens unit having an optical length and an optical lens system attached to a housing to provide an image to the image pickup device. The electronic apparatus may include at least one of a recorder having a recording medium, a main board containing devices to operate as operating devices, and a main body having a holder to be used by a user to hold the electronic apparatus. The system controller may control operation of the fuel cell device based on a temperature obtained from at least one of the lens unit, the recorder, the operating devices, and the holder.

According to an aspect of the present invention, an electronic apparatus, includes a fuel cell device configured to control generation of electrical power, wherein the electronic apparatus is configured to be mobile and held in a user's hand while being operated, an image pickup device positioned relative to the fuel cell device and configured to convert an image into an image pickup signal, a lens unit configured to provide the image to the image pickup device, a temperature sensor configured to obtain a temperature from the lens unit, a system controller configured to control operation of the fuel cell device based on the temperature, and a secondary battery as a power storage unit configured to store electrical power generated by the fuel cell device, wherein when the temperature exceeds a reference temperature and a remaining power level in the secondary battery is at least equal to a reference power level, the system controller is configured to halt a moving supply of fuel to the fuel cell device.

According to another aspect of the present invention, the electronic apparatus may further include a display unit configured to display an operating state of the fuel cell device.

According to another aspect of the present invention, an electronic apparatus is provided which includes a fuel cell device configured to supply electrical power to the electronic apparatus; an image pickup device configured to convert an image into an electric signal; a temperature sensor configured to measure a temperature at the image pickup device or proximate thereof; and a controller configured to control operation of the fuel cell device based on output from the temperature sensor.

Moreover, according to yet another aspect of the present invention, an electronic apparatus is provided which includes a fuel cell device configured to supply electrical power to the electronic apparatus; an optical lens system; a temperature sensor configured to measure temperature at the optical lens system or proximate thereof; and a controller configured to control operation of the fuel cell device base on output from the temperature sensor.

Additionally, according to another aspect of the present invention, an electronic apparatus is provided which includes a fuel cell device configured to supply electrical power to the electronic apparatus; an operating circuit configured to control a main body of the electronic apparatus and for performing various types of operations; a temperature sensor configured to measure temperature at the operating circuit or proximate thereof; and a controller configured to control operation of the fuel cell device based on output from the temperature sensor.

According to another aspect of the present invention, an electronic apparatus is provided which includes a fuel cell device configured to supply electrical power to the electronic apparatus; a recording unit configured to record information on a recording medium; a temperature sensor configured to measure temperature at the recording unit or proximate thereof; and a controller configured to control operation of the fuel cell device based on output from the temperature sensor.

Furthermore, according to an aspect of the present invention, an electronic apparatus is provided which includes a fuel cell device configured to supply electrical power to the electronic apparatus; a holder configured to allow a user to hold the electronic apparatus; a temperature sensor configured to measure temperature at the holder or proximate thereof; and a controller configured to control operation of the fuel cell device based on output from the temperature sensor.

Moreover, according to an aspect of the present invention, a method is provided for controlling a fuel cell integrated within and configured to supply power to an electronic apparatus, wherein the apparatus also includes a power storage unit configured to store the power generated by the fuel cell device. The method include measuring within the electronic apparatus a temperature at a measuring point other than at the fuel cell device; determining an amount of remaining power stored in the power storage unit; and controlling operation of the fuel cell device based on the temperature measured at the point other than at the fuel cell and based on the determined amount of remaining power stored in the power storage unit.

And finally, according to another aspect of the present invention, a computer readable medium is provided containing computer-executable instructions for controlling a fuel cell integrated within and configured to supply power to an electronic apparatus, wherein the apparatus also includes a power storage unit configured to store the power generated by the fuel cell device. The medium includes computer-executable instructions for measuring within the electronic apparatus a temperature at a measuring point other than at the fuel cell device; computer-executable instructions for determining an amount of remaining power stored in the power storage unit; and computer-executable instructions for controlling operation of the fuel cell device based on the temperature measured at the point other than at the fuel cell and based on the determined amount of remaining power stored in the power storage unit.

An exemplary embodiment of the present invention may be a digital video camera is which includes a fuel cell device as a power source; a temperature sensor, for detecting a temperature in the vicinity of a CCD; and a system controller, for controlling the operation of the fuel cell device based on the output of the temperature sensor. When the temperature of the CCD, for example, exceeds a reference determination temperature, and when the remaining power on a lithium ion secondary battery is equal to or higher than a reference level, the system controller closes a control valve and halts the supply of fuel to a fuel cell. In this manner, for the electronic apparatus that employs the fuel cell device as a power source, temperature management is enabled without the function of the apparatus being deteriorated.

According to the present invention, consonant with the electronic apparatus that employs the fuel cell device as a power source, the temperatures at the several portions of the electronic apparatus, other than at the fuel cell device, and the operation of the fuel cell device are controlled based on the detected temperatures. Therefore, temperature management of the electronic apparatus is enabled, so that the apparatus can be operated correctly without the function being deteriorated due to heat generated by the fuel cell device.

The above embodiments, aspect and features of the present invention will become more apparent from the following detailed description taken in conjunction with the accompany with drawings.

BRIEF DESCRIPTION OF THE DRAWINGS

FIG. 3 is a block diagram showing an exemplary system configuration of the video camera according to an embodiment of the present invention;

FIG. 6 is a flowchart for explaining an exemplary operation of the video camera according to an embodiment of the present invention.

DESCRIPTION OF THE EMBODIMENTS

An electronic apparatus according to an embodiment of the present invention will now be described while referring to the accompanying drawings.

Figure 1B:
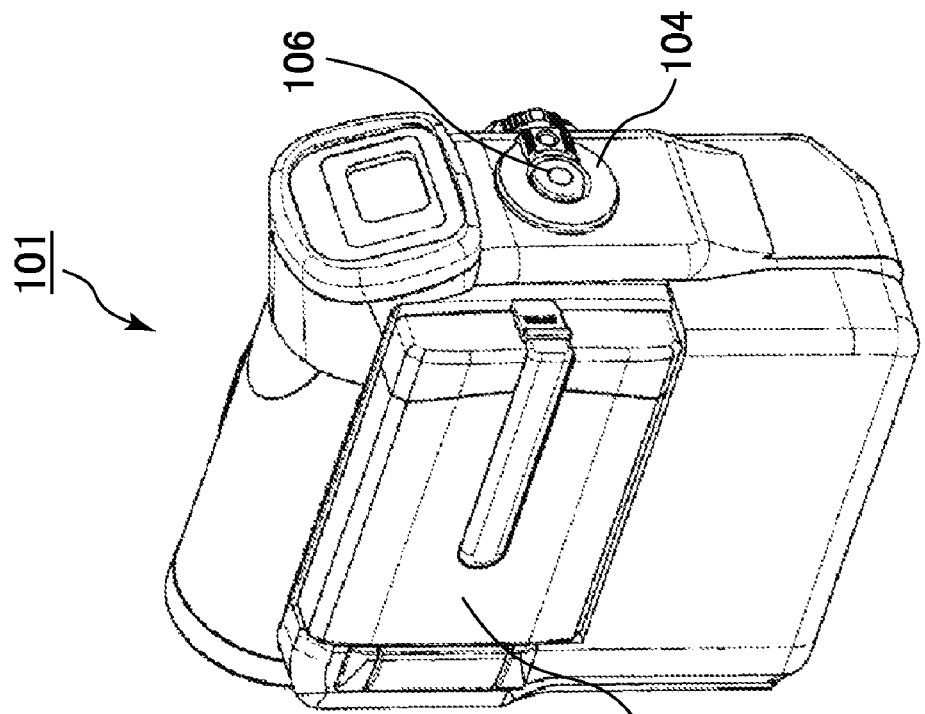
FIGS. 1A and 1B are outline diagrams showing an exemplary video camera according to an embodiment of the present invention.
Figure 1A:
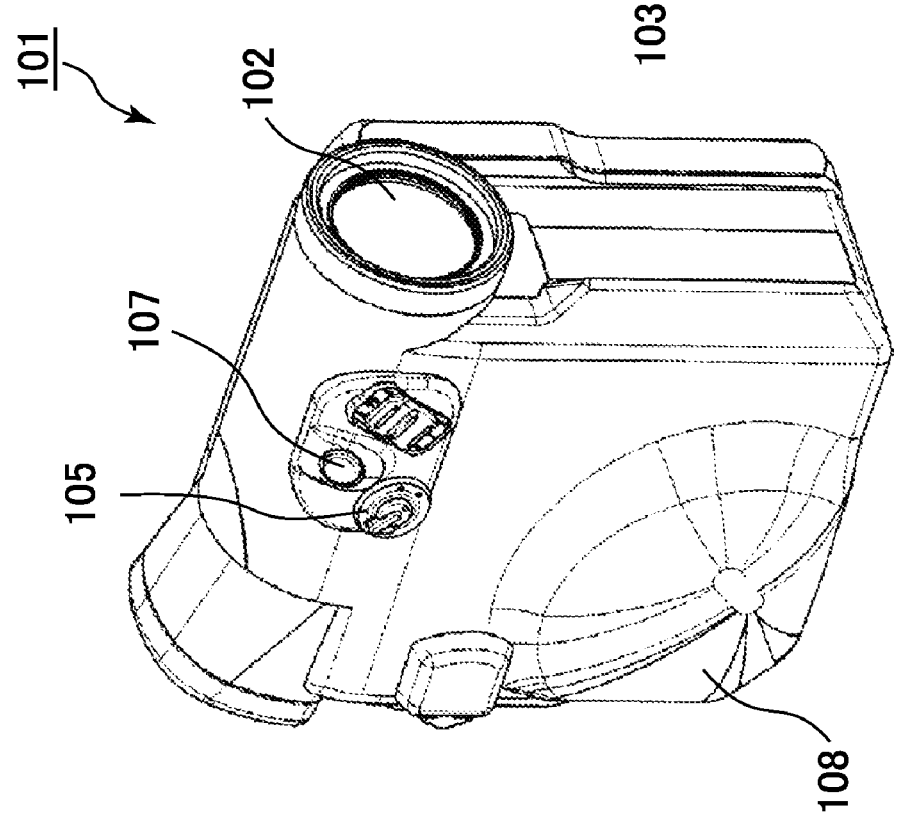
Figure 2:
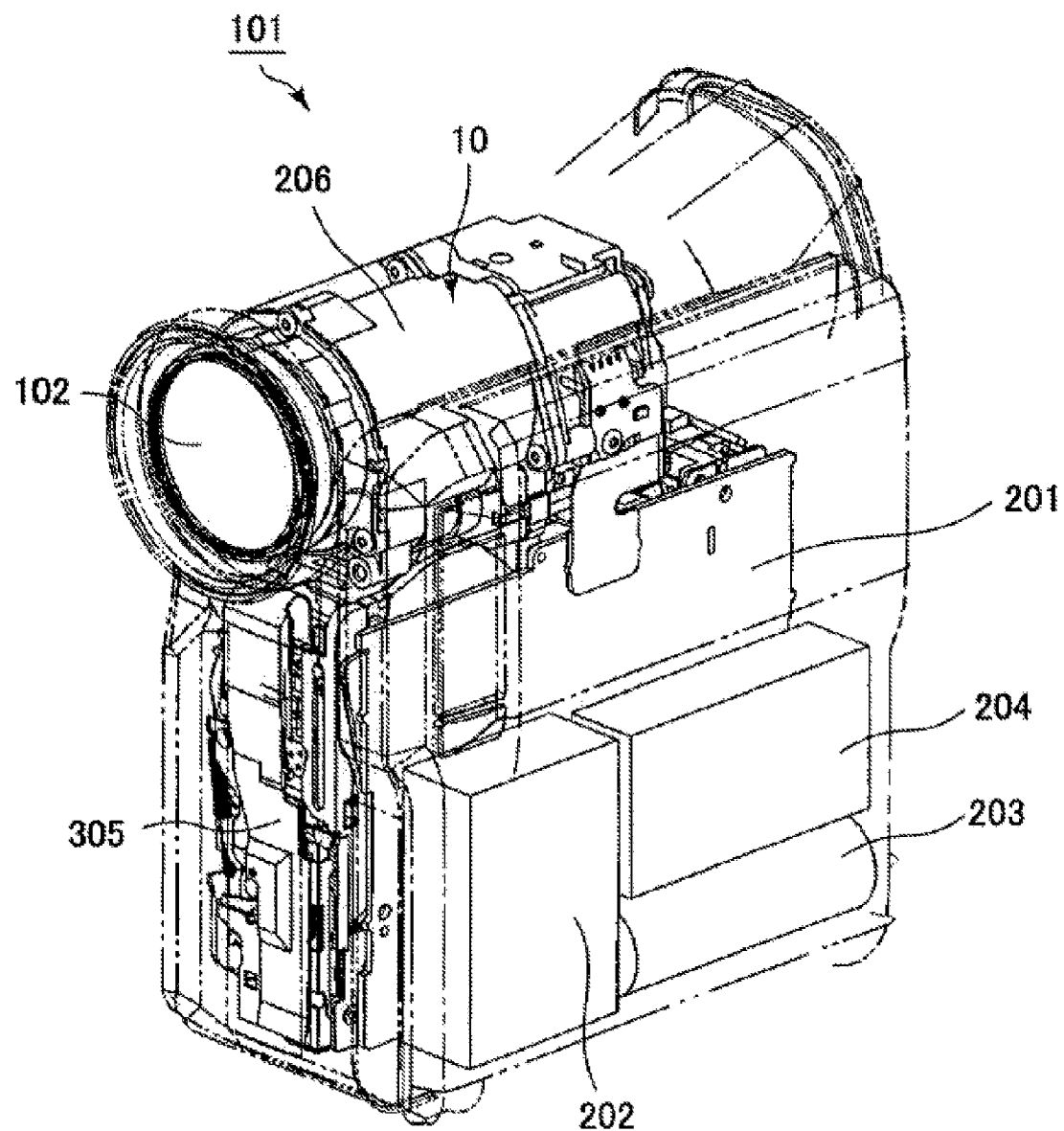
FIG. 2 is a perspective view of the internal structure of the exemplary video camera according to an embodiment of the present invention.

While referring to the drawings, a video camera will now be described as an example embodiment of the present invention. FIGS. 1A and 1B are outline diagrams showing a video camera 101 according to the embodiment of the invention. FIG. 1A is a front perspective view, and FIG. 1B is a rear perspective view. FIG. 2 is a perspective view of the internal structure of the video camera 101. And FIG. 3 is a block diagram showing the system configuration of the video camera 101.

In FIGS. 1A and 1B, an optical lens system 102 and an LCD monitor 103 are shown that are coupled so as to be open and closed, with the main body of the video camera 101. The LCD motor 103 is used to display moving pictures and still pictures output by a signal processing circuit 302 (see FIG. 3), or moving pictures and still pictures reproduced by a recording/reproduction circuit 304. At the same time, on the LCD monitor 103, characters and icons, which are generated by a character generator 307 based on a variety of information provided by the video camera 101 and issued by a system controller 306, are displayed over the pictures as an on-screen display.

An operation switch 104 is manipulated by a user, so that the mode of the video camera 101, a recording mode or a play mode, is reported to the system controller 306, and in accordance with the mode, the system controller 306 controls the individual sections provided by the video camera 101. A mode selection switch 105 is used to select either a moving picture recording mode or a still picture recording mode. A trigger button 106 is used to instruct the start of the recording of moving pictures. A release button 107 is used to instruct the start of the recording of still pictures. A holder 108 is used by a user to hold the video camera 101.

Shown in FIG. 2 are a main board 201, a fuel cell device 202, and a fuel cartridge 203, detachably mounted on the main body of the video camera 101, that a user must replace to provide a new supply of fuel. Further, a lithium ion secondary battery 204 corresponds to a power storage unit according to the invention, and a lens unit 206 includes the optical lens system 102.

In FIG. 3, a CCD 301 is an image pickup device for converting an image into an electric signal. An image of an object, transmitted through the lens unit 206, which includes the optical lens system 102, is formed on the image pickup face of the CCD 301, and is then photoelectrically converted by the CCD 301 and output as an image pickup signal. In this embodiment, the block for forming an image through the CCD 301, extending from the optical lens system 102 and continuing until the image pickup signal is output, is defined as a camera section 10 (see FIG. 2).

A signal processing circuit 302 converts into a video signal an image pickup signal output by the camera section 10. A video signal output by the signal processing circuit 302 is passed through an encoder (not shown), such as an NTSC, and is converted by a recording circuit 303 into a recording signal for the recording of data on magnetic tape. A recording/reproduction circuit 304 can either record a recording signal on magnetic tape, or can read a picture signal from magnetic tape and convert this signal into one that can be displayed on the LCD monitor 103. A signal converted by the recording/reproduction circuit 304 can also be displayed on an external display device.

And in this embodiment, a recorder 305 can magnetically record a recording signal on magnetic tape, or instead of on magnetic tape, on another recording medium, such as a memory card or a recording disk. The system controller 306 controls the operations of the individual sections of the video camera 101; a character generator 307 generates characters and icons based on information received from the video camera 101; and a nonvolatile memory 308 is used to store, in advance, information for the video camera 101. The aforementioned circuits are mounted on the main board 201. And further, a temperature sensor 315 obtains temperature information for the CCD 301, and a temperature sensor 316 obtains temperature information for the lens unit 206.

In this exemplary embodiment, the fuel cell device 202 includes a pump 309, a control valve 310, a reformation device 311, a fuel cell 312 and a fuel detector 313. The fuel cartridge 203 is a container in which is stored a fuel such as methanol, gasoline, LP gas or natural gas. The fuel is conveyed by the pump 309, via the control valve 310, to the reformation device 311, and the reformation device 311 generates a gas fuel, such as modified hydrogen, using a steam reformation reaction of methanol.

At this time, the reformation device 311 is controlled in accordance with an instruction issued by the system controller 306. And a gas fuel that contains the reformed hydrogen obtained by the reforming device 311 is transferred to the fuel cell 312 and reacts with oxygen in the air. Then, electricity is generated, and at the same time, water is discharged. Further, the fuel detector 313, located along a fuel path from the reformation device 311 to the fuel cell 312, determines whether gas fuel has been supplied to the fuel cell 312, and transmits the thus obtained information to the system controller 306.

Electricity generated by the fuel cell 312 is supplied, for charging, to the lithium ion secondary battery 204. At this time, the recharging of the lithium ion secondary battery 204 is controlled in accordance with an instruction issued by the system controller 306, and the individual sections of the video camera 101 are operated by a current supplied by the lithium ion secondary battery 204.

A remaining power detection circuit 314, for detecting the remaining power of a lithium ion secondary battery, is provided for the detection of the remaining power (the recharged power) of the lithium ion secondary battery 204. The system controller 306 reads the outputs of the temperature sensors 315 and 316, and at the same time, periodically accesses the remaining power detection circuit 314 to determine how much power remains on the lithium ion secondary battery (the amount of remaining power on the lithium ion secondary battery).

An explanation will now be given for why power is supplied to the video camera 101 via the lithium ion secondary power 204. Since electricity is extracted from the fuel cell 312 as energy that is generated during the process by which water is generated through the reaction of hydrogen and oxygen, the output is proportional to the flow rate of the gas fuel. However, the fuel cell gas generation capability of the reformation device 311 requires a constant response time, relative to the fluctuation of the amount of gas generated, and it is difficult for the flow rate of the fuel gas to quickly and accurately catch up with a request for a drastic change in the output. That is, the response property, relative to load, is inferior when compared with a dry cell battery or other secondary battery, a conventional power source for an electronic apparatus. In order to eliminate this problem, the lithium ion secondary battery 204 is employed as a buffer for the fluctuation of the power consumed by the video camera 101.

Figure 4A:
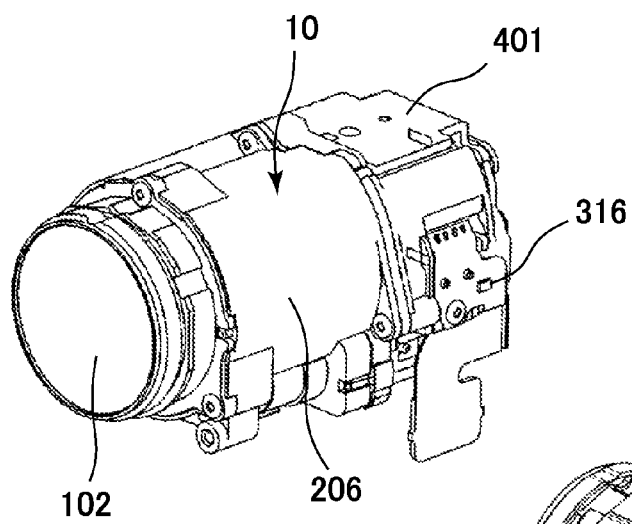
FIGS. 4A and 4B is an outline diagram showing an exemplary camera unit of the video camera according to an embodiment of the present invention.
Figure 4B:
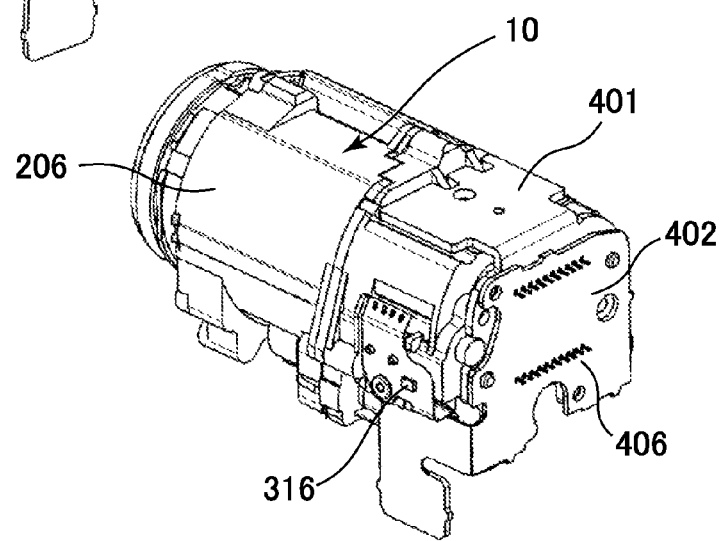
Figure 5:
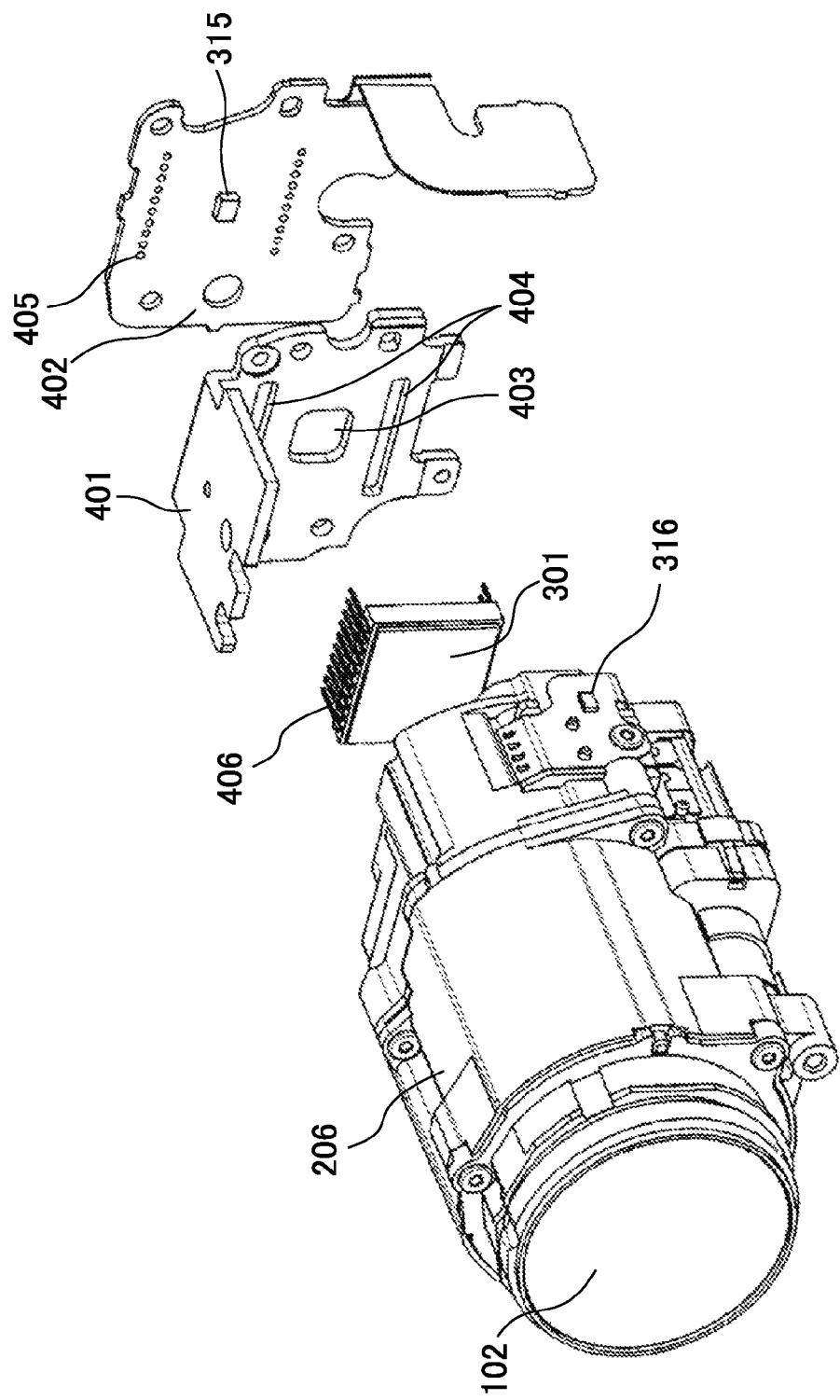
FIG. 5 is an exploded perspective view of the structure of the camera unit of the video camera according to an embodiment of the present invention.

An exemplary structure of the camera section 10 will now be described. FIGS. 4A and 4B are outline diagrams of the camera section 10. FIG. 4A is a front perspective view and FIG. 4B is a rear perspective view, and FIG. 5 is an exploded perspective view of the structure of the camera section 10.

The camera section 10 is designed so that the CCD 301 is attached to the lens unit 206, wherein the optical lens system 102 is stored in a resin housing. More specifically, as shown in FIG. 5, the CCD 301 is fixed to a CCD mounting member 401 by the use, for example, of an adhesive, and a board 402 is attached to the side opposite the CCD 301 and extending across the CCD mounting member 401.

Holes 404 are formed in the CCD mounting member 401 for the insertion of connection terminals 406 for the CCD 301. Further, holes 405 are formed in the board 402 for the insertion of the connection terminals 406 of the CCD 301, and a soldering land (not shown) is so arranged that it encloses these holes 405.

The CCD 301 is fixed at a predetermined optical position when the CCD mounting member 401 is attached to the lens unit 206, using screws (not shown), and is electrically connected when, as shown in FIG. 4B, the connection terminals 406, projecting from the holes 405, are soldered to the board 402.

Furthermore, formed in the CCD mounting member 401, at a position corresponding to the reverse face of the CCD 301, is an opening 403, and on the board 402, the temperature sensor 315 is arranged at a position corresponding to the opening 403. The temperature sensor 315 outputs a voltage consonant with the temperature in the vicinity of the reverse face of the CCD 301, and when the system controller 306 reads the voltage, the temperature of the CCD 301 can be obtained. The temperature information for the CCD 301 that is thus obtained, and the remaining power information, previously described for the lithium ion secondary battery 204, are sequentially recorded and stored in the memory 308.

In addition, the temperature sensor 316 is arranged on the side face of the housing of the lens unit 206. The temperature sensor 316 outputs a voltage consonant with the air temperature in the vicinity of the lens unit 206, and as for the temperature sensor 315, when the system controller 306 reads the voltage, the temperature near the lens unit 206 (regarded as being almost the equivalent of the temperature of the housing of the lens unit 206) can be obtained.

As shown in FIG. 2, as a layout, the thus arranged camera section 10 is mounted on the upper face of a recording unit, wherein the recorder 305 and the main board 201 are adjacently arranged. Together, the recorder unit and the camera section 10 provide the total height of the video camera 101.

Exemplary operation of the video camera 101 for this embodiment will now be described while referring to FIGS. 6 and 7A to 7C. FIG. 6 is a flowchart for explaining an example algorithm for the control operation of the fuel cell device 202 of the video camera 101. While FIGS. 7A to 7C are diagrams showing example displays, presented on the LCD monitor 103, of characters generated by the character generator 307.

First, temperature information of the CCD 301 is obtained from the temperature sensor 315 (step 501). Then, the system controller 306 determines whether the temperature of the CCD 301 is higher or lower than a predesignated reference temperature (step 502).

When, at step 502, the temperature of the CCD 301 is equal to or lower than the reference temperature (YES in step 502), the system controller 306 accesses the fuel detector 313 to determine whether fuel gas is currently being supplied to the fuel cell 312 (step 503).

Figure 7A:
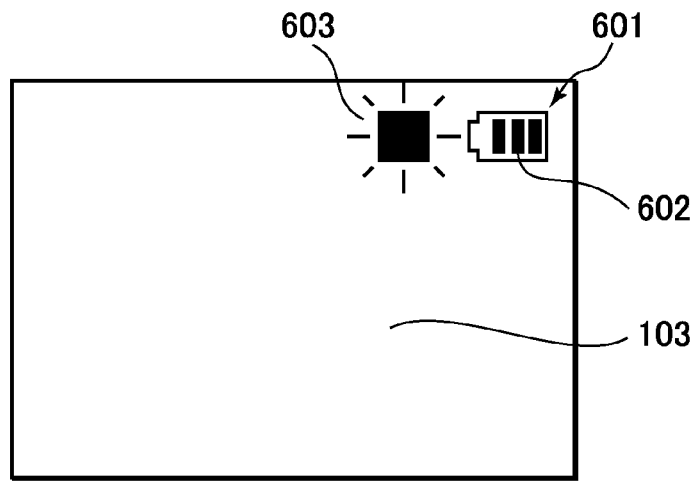
FIGS. 7A, 7B and 7C are diagrams showing display examples for the video camera according to an embodiment of the present invention.
Figure 7B:
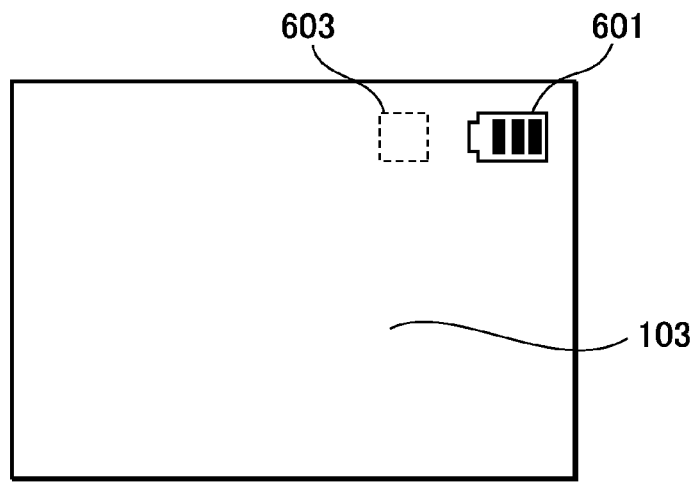
Figure 7C:
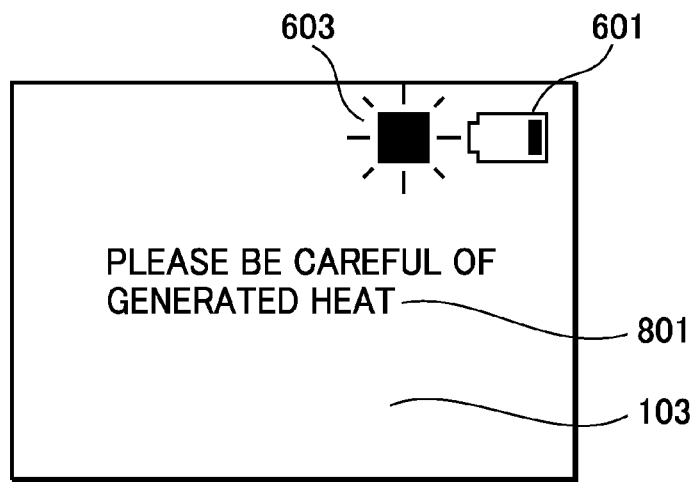

When, at step 503, the fuel gas is currently being supplied, the operating state of the fuel cell device 202 is displayed for a user (step 504; see FIG. 7A). Thereafter, the system controller 306 returns to step 501, and during a predetermined cycle, obtains the next temperature information of the CCD 301.

In the example in FIG. 7A, the operating state of the fuel cell device 202 is displayed on the LCD monitor 103. And a character, such as a letter or an icon, generated by the character generator 307, is superimposed on a picture (not shown) and displayed on the LCD monitor 103. Information, such as the setup contents for the apparatus or a shooting time, is displayed using characters. Further, as shown in FIG. 7A, the remaining power for the lithium ion secondary battery 204 and the operating state of the fuel cell device 202 can also be additionally displayed as icons.

In FIG. 7A, an icon 601 resembling a battery is used to specifically represent the amount off power remaining for the lithium ion secondary battery 204. The space inside the frame of the model battery 601 is divided into several segments 602 that can be turned on and off, individually, to visually indicate, for a user, the remaining battery power. Further, an icon 603 is used to provide for the user the operating state of the fuel cell device 202. When power is being generated by the fuel cell 312, the square icon 603 blinks on and off.

When, at step 503, the fuel gas is not currently being supplied, the system controller 306 opens the control valve 310 to resume the supply of fuel to the fuel cell 312 (step 505), and in the same manner as described above, displays for the user the operating state of the fuel cell device 202 (step 504). Thereafter, the system controller 306 returns to step 501, and obtains, for the predetermined cycle, the next temperature information of the CCD 301.

When, at step 502, the temperature of the CCD 301 is higher than the reference temperature, as in the above case, the system controller 306 accesses the fuel detector 313 to determine whether the fuel gas is currently being supplied to the fuel cell 312 (step 506).

When, at step 506, the fuel gas is currently being supplied, the system controller 306 refers to the remaining power information, for the lithium ion secondary battery 204, that is obtained by the remaining power detection circuit 314 (step 507), and determines whether the remaining power for the lithium ion secondary battery 204 is higher or lower than a predesignated reference level (step 508).

When, at step 508, the remaining power for the lithium ion secondary battery 204 is equal to or higher than the reference level, the system controller 306 closes the control valve 310, and halts the supply of fuel to the fuel cell 312 (step 509). Then, the system controller 306 displays for the user the operating state of the fuel cell device 202 (step 504; see FIG. 7B). Thereafter, the system controller 306 returns to step 501, and obtains, for the predetermined cycle, the next temperature information of the CCD 301.

In the example in FIG. 7B, the halted state of the fuel cell 312 is displayed on the LCD monitor 103. That is, the square icon 603, which is used to indicate the operating state of the fuel cell device 202, is not displayed on the LCD monitor 103, indicating that the fuel cell 312 operation is halted. In FIG. 7B, broken lines are used to indicate that the icon 603 is not displayed, and to make the explanation easier to understand. This display permits a user to visually determine that only the power remaining in the lithium ion secondary battery 204 is available for use by the video camera 101.

When, at step 508, the power remaining in the lithium ion secondary battery 204 is lower than the reference level, the system controller 306 displays, on the LCD monitor 103, a warning indicating that heat is being generated (step 510; see FIG. 7C), and also displays for the user the operating state of the fuel cell device 202 (step 504). Thereafter, the system controller 306 returns to step 501, and obtains, for the predetermined cycle, the next temperature information for the CCD 301.

When, at step 506, no fuel gas is supplied (e.g., a fault or a lack of fuel), the system controller 306 displays on the LCD monitor 103 a warning indicating that heat is being generated (step 510; see FIG. 7C), and also displays for the user the operating state of the fuel cell device 202 (step 504). Thereafter, the system controller 306 returns to step 501, and obtains for the predetermined cycle the next temperature information of the CCD 301.

In the example in FIG. 7C, a warning is displayed on the LCD monitor 103. On the LCD monitor 103, the blinking square icon 603 indicates that the fuel cell 312 is currently being operated, and characters 801, generated by the character generator 307 (e.g., the message "PLEASE BE CAREFUL OF GENERATED HEAT" or the like), are displayed to provide a warning for a user.

The exemplary control operation has been explained. When, however, at step 508, the power remaining on the lithium ion secondary battery 204 is lower than the reference level, the operation of the fuel cell battery may be halted, in addition to the operation shown in FIG. 6. In this case, characters, such as the message, "BATTERY POWER IS GETTING LOW", are displayed on the LCD monitor 103, so as to notify the user that the available power is limited to that remaining on the lithium ion secondary battery 203.

Further, the power consumed by a video camera generally differs, depending on the operating mode. For example, in the still picture recording mode, unlike in the moving picture recording mode, power consumption is low because automatic focusing, for which power is required, need not always be employed, and because an audio circuit is also not required. Further, in the play mode, power for the camera section 10 that is not required for picture reproduction can be reduced, so that the power consumed is decreased. Therefore, at step 508, to determine how much power remains on the lithium ion secondary battery 204, the reference used for this determination can be changed in accordance with the operating mode. In this case, remaining power determination references consonant with the operating modes are stored in the memory 308, and can be read before the process at step 508 is performed, so that correlation with the individual operating modes is possible.

Or in an another alternative, the following method may be employed. Since in the play mode pictures are not stored, at step 502 the determination reference temperature can be changed to permit the temperature of the CCD 301 to rise higher than in the shooting mode, so that power can be distributed and used for charging the lithium ion secondary battery 204. Also, in this case, the reference temperature information for the individual operating modes must only be stored in and read from the memory 308.

The display form for the operating state of the fuel cell device 202 presented on the LCD monitor 103 is not limited to that explained in the embodiment. Thus, the display form is not limited to the icon used in the embodiment, and the design of the icon is not especially restricted. So long as an electronic apparatus includes a video display device, such as an LCD monitor, an indicator may be provided by using an LED device, for example, and the operating state may be displayed by turning on/off or blinking the indicator.

In the above described embodiment, the temperature sensor 315 has been arranged in the vicinity of the CCD 301 to detect the temperature of the CCD 301 and to control the operation of the fuel cell device 202. However, the parameter for the control of the operation of the fuel cell device 202 is not limited to the temperature of the CCD 301.

For example, for the video camera 101 of this embodiment, the temperature sensor 316 is also provided on the side face of the lens unit 206, and the operation of the fuel cell device 202 can be controlled by using the output of the temperature sensor 316. That is, when the temperature in the vicinity of the lens unit 206 is raised excessively, and when a change in the optical length, due to thermal expansion of the housing of the lens unit 206, exceeds the electrical correction range, the operation of the fuel cell 312 can be halted to prevent a rise in the temperature, and a defect such as a loss of focus caused by heat can be coped with.

Furthermore, when the operating devices on the main board 201 have heat endurances inferior to that of the CCD 301, a unit for obtaining temperature information for the operating devices may be provided, and may perform the same control process as is described above.

Further, a unit can be used for detecting the temperature at a predetermined location in the recorder 305. And when magnetic tape is employed as a recording medium, as in the video camera 101 of this embodiment and as is described above, impedance due to the temperature characteristic of the tape may be encountered. Further, when an optical disk is employed as a recording medium, a laser oscillator is employed as a recording unit, and in this case, since S/N is degraded due to a rise in temperature, temperature compensation is also required. Therefore, through the detection of the temperature at the recording head of the recorder 305, and in its vicinity, or the temperature of the recording medium, and by controlling the fuel cell device 202, the prevention of an excessive rise in temperature can be prevented.

Moreover, for a mobile apparatus that is held by a user while being operated, when the temperature information is obtained to control the operation of the fuel cell device 202 for the portion held by the user (the portion 108 in FIG. 1A in this embodiment), the uncomfortable feeling the user may experience, as a result of generated heat, can be reduced.

In either case, when appropriate values are set for the determination reference temperature and the power determination reference level for the secondary battery, the present invention can be satisfactorily carried out.

Of course, an electronic apparatus for which the present invention can be applied is not limited to a video camera, as in the embodiment, and can be applied for any type of electronic apparatus that employs a fuel cell as a power source.

As described above, in an electronic apparatus that employs a fuel cell device as a power source, temperature management can be performed so that the electronic apparatus can be operated correctly without its function being deteriorated due to the heat generated by the fuel cell device.

Specifically, when a fuel cell is controlled in accordance with the temperature information for the CCD, the occurrence of a white scratch can be prevented. Further, when the operation of the fuel cell is controlled using the temperature information for the lens unit, the affect of an optical change produced by heat can be suppressed. In addition, when the operation of the fuel cell is controlled based on the temperature information for the operating devices, such as the LSI, the thermal runaway of the LSI, for example, can be avoided.

Furthermore, when the operation of the fuel cell is performed in accordance with the temperature information for the recorder, recording stabilization can be supported, in consonance with the temperature characteristic of the recording medium, and impedance, such as that which produces a recording error, can be avoided. Thus, an electronic apparatus can be provided wherein constituents are not damaged by heat, and failures and defects rarely occur.

Also, when the operation of a fuel cell is controlled based on temperature information for the holder, an electronic apparatus can be provided that does not cause a user to experience an uncomfortable feeling due to generated heat, but as for usability, is superior.

In addition, since a unit is included for notifying a user of the operating state of the fuel cell, the user can quickly obtain information concerning the operating state. And since information relative to the generation of heat by the electronic apparatus, or the danger that a malfunction due to generated heat may occur can be provided the user, a user-friendly electronic apparatus can be provided.

While the present invention has been described with reference to exemplary embodiments, it is to be understood that the invention is not limited to the disclosed exemplary embodiments. Rather, it is intended that the scope of the following claims is to be accorded the broadest interpretation, so as to encompass all such modifications and equivalent structures and functions.

What is claimed:

1. An electronic apparatus, comprising:
   a fuel cell device configured to control generation of electrical power, wherein the electronic apparatus is configured to be mobile and held in a user's hand while being operated;
   an image pickup device positioned relative to the fuel cell device and configured to convert an image into an image pickup signal;
   a lens unit configured to provide the image to the image pickup device;
   a temperature sensor configured to obtain a temperature from the lens unit;
   a system controller configured to control operation of the fuel cell device based on the temperature; and
   a secondary battery as a power storage unit configured to store electrical power generated by the fuel cell device, wherein when the temperature exceeds a reference temperature and a remaining power level in the secondary battery is at least equal to a reference power level, the system controller is configured to halt a moving supply of fuel to the fuel cell device.

2. The electronic apparatus of claim 1, wherein the temperature sensor is positioned remote from the lens unit to obtain almost an equivalent of a temperature of a housing of the lens unit.

3. An electronic apparatus, comprising:
   a fuel cell device configured to control generation of electrical power, wherein the electronic apparatus is configured to be mobile and held in a user's hand while being operated;
   an image pickup device positioned relative to the fuel cell device and configured to convert an image into an image pickup signal;
   at least one of a recorder having a recording medium, a main board containing devices that are configured to operate as operating devices, and a main body having a holder that is configured to be used by a user to hold the electronic apparatus;
   a temperature sensor configured to obtain a temperature from one of the recorder, the operating devices, and the holder;
   a system controller configured to control operation of the fuel cell device based on the temperature; and
   a secondary battery as a power storage unit configured to store electrical power generated by the fuel cell device, wherein when the temperature exceeds a reference temperature and a remaining power level in the secondary battery is at least equal to a reference power level, the system controller is configured to halt a moving supply of fuel to the fuel cell device.

4. A method to manage temperature in an electronic apparatus having a fuel cell device, an image pickup device positioned relative to the fuel cell device, a lens unit, a temperature sensor, a system controller, and a secondary battery as a power storage unit, the method comprising:
   controlling generation of electrical power using the fuel cell device, wherein the electronic apparatus is configured to be mobile and held in a user's hand while being operated;
   converting an image into an image pickup signal using the image pickup device;
   providing the image to the image pickup device using the lens unit;
   obtaining a temperature from the lens unit using the temperature sensor;
   controlling operation of the fuel cell device, using the system controller, based on the temperature; and
   storing electrical power generated by the fuel cell device using the secondary battery, wherein when the temperature exceeds a reference temperature and a remaining power level in the secondary battery is at least equal to a reference power level, controlling includes halting a moving supply of fuel to the fuel cell device.

5. The method of claim 4, wherein the temperature sensor is positioned remote from the lens unit, the method further comprising:
   obtaining almost an equivalent of a temperature of a housing of the lens unit.

6. A non-transitory computer-readable medium having stored thereon, a program that causes an electronic apparatus to perform the method according to claim 5.

7. A method to manage temperature in an electronic apparatus having a fuel cell device, an image pickup device positioned relative to the fuel cell device, at least one of a recorder having a recording medium, a main board containing devices that are configured to operate as operating devices, and a main body having a holder that is configured to be used by a user to hold the electronic apparatus, a temperature sensor, a system controller, and a secondary battery as a power storage unit, the method comprising:

controlling generation of electrical power using the fuel cell device, wherein the electronic apparatus is configured to be mobile and held in a user's hand while being operated;

converting an image into an image pickup signal using the image pickup device;

obtaining a temperature from one of the recorder, the operating devices, and the holder using the temperature sensor;

controlling operation of the fuel cell device, using the system controller, based on the temperature; and storing electrical power generated by the fuel cell device in the secondary battery, wherein when the temperature exceeds a reference temperature and a remaining power level in the secondary battery is at least equal to a reference power level, controlling includes halting a moving supply of fuel to the fuel cell device.

8. A non-transitory computer-readable medium having stored thereon, a program that causes an electronic apparatus to perform the method according to claim 7.

* * * * *